(12) United States Patent
Noel, Jr. et al.

(10) Patent No.: US 6,671,725 B1
(45) Date of Patent: Dec. 30, 2003

(54) SERVER CLUSTER INTERCONNECTION USING NETWORK PROCESSOR

(75) Inventors: Francis Edward Noel, Jr., Durham, NC (US); Charles Joseph Sannipoli, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/551,707

(22) Filed: Apr. 18, 2000

(51) Int. Cl.[7] ............................................. G06F 15/173
(52) U.S. Cl. ..................... 709/226; 709/224; 709/234; 709/220
(58) Field of Search ................................. 709/255, 226, 709/220, 240, 245, 224, 234

(56) References Cited

U.S. PATENT DOCUMENTS

| | | | |
|---|---|---|---|
| 5,008,878 A | 4/1991 | Ahmadi et al. ............... | 370/60 |
| 5,724,348 A | 3/1998 | Basso et al. ................. | 370/384 |
| 5,774,660 A * | 6/1998 | Brendel et al. ............. | 709/201 |
| 6,006,264 A * | 12/1999 | Colby et al. ................ | 709/226 |
| 6,182,139 B1 | 1/2001 | Brendel ....................... | 709/226 |
| 6,263,368 B1 * | 7/2001 | Martin ......................... | 709/224 |
| 6,286,047 B1 * | 9/2001 | Ramanathan et al. ....... | 709/224 |
| 6,327,622 B1 * | 12/2001 | Jindal et al. ................. | 709/228 |
| 6,374,297 B1 * | 4/2002 | Wolf et al. .................. | 709/226 |
| 6,449,647 B1 * | 9/2002 | Colby et al. ................ | 709/226 |

FOREIGN PATENT DOCUMENTS

| | | | |
|---|---|---|---|
| EP | 0865180 A2 | 9/1998 | ........... H04L/12/56 |
| EP | 1049307 | 2/2000 | ........... H04L/29/06 |
| EP | 1128612 A2 | 8/2001 | ........... H04L/12/56 |
| WO | 00/62502 | 10/2000 | ........... H04L/29/00 |
| WO | 01/4093 A2 | 6/2001 | |

* cited by examiner

Primary Examiner—David Wiley
Assistant Examiner—Phuoc Nguyen
(74) Attorney, Agent, or Firm—Scott W. Reid

(57) ABSTRACT

A server farm formed by a plurality of computer systems joined together by a network processor which transfers data exchanged with an external network supported by the server farm at a data rate substantially the same as the data flow rate of the network and related method.

5 Claims, 4 Drawing Sheets

SERVER CLUSTER INTERCONNECTION USING NETWORK PROCESSOR

RELATED APPLICATIONS

The interested reader is referred, for assistance in understanding the inventions here described, to the following prior disclosures which are relevant to the description which follows and each of which is hereby incorporated by reference into this description as fully as if here repeated in full:

U.S. Pat. No. 5,008,878 issued Apr. 16, 1991 for High Speed Modular Switching Apparatus for Circuit and Packet Switched Traffic;

U.S. Pat. No. 5,724,348 issued Mar. 3, 1998 for Efficient Hardware/Software Interface for a Data Switch;

U.S. patent application Ser. No. 09/330,968 filed Jun. 11, 1999 and entitled "High Speed Parallel/Serial Link for Data Communication";

U.S. patent application Ser. No. 09/384,689 filed Aug. 27, 1999 and entitled "VLSI Network Processor and Methods";

U.S. patent application Ser. No. 09/384,691 filed Aug. 27, 1999 and entitled "Network Processor Processing Complex and Methods";

U.S. patent application Ser. No. 09/384,692 filed Aug. 27, 1999 and entitled "Network Switch and Components and Method of Operation"; and U.S. patent application Ser. No. 09/384,744 filed Aug. 27, 1999 and entitled "Network Processor, Memory Organization and Methods".

BACKGROUND OF THE INVENTION

The development of the EDVAC computer system of 1948 is often cited as the beginning of the computer era. Since that time, computer systems have evolved into extremely sophisticated devices, and computer systems may be found in many different settings. Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful than those that existed just a few years ago.

Other changes in technology have also profoundly affected how we use computers. For example, the widespread proliferation of computers prompted the development of computer networks that allow computers to communicate with each other. With the introduction of the personal computer (PC), computing became accessible to large numbers of people. Networks for personal computers were developed to allow individual users to communicate with each other. In this manner, a large number of people within a company, or between companies, could communicate simultaneously over a network with a software application running on a single computer system.

One significant computer network that has recently become very popular is the Internet. The Internet grew out of the modern proliferation of computers and networks, and has evolved into a sophisticated worldwide network of linked computer systems which contain web pages. This system of communication networks and computer systems collectively make up the "world-wide web", or WWW. A user at an individual PC (i.e., workstation) that wishes to access the WWW typically does so using a software application known as a web browser. A web page browser makes a connection via the Internet to computers known as web servers, and receives information from the web servers that is displayed on the user's workstation. Information displayed to the user is typically organized into pages that are constructed using a specialized language called Hypertext Markup Language (HTML). Web browsers that use HTML are now available for almost every computer system on the market, making the WWW accessible to practically anyone who has access to a computer and a modem. Although the WWW is becoming increasingly popular, the rapid growth and expansion of computer users accessing the WWW has brought along with it concomitant problems. Some of these problems are identified in this discussion.

Two outgrowths of the world wide web are server farms and DASD (for Direct Access Storage Device, discussed hereinafter) farms. In each instance, the use of the term "farm" is intended to communicate that a number of devices are operatively coupled together in such a way that data may flow more or less seamlessly between the end users to any of the cooperating devices in a farm. Thus a plurality of server computer systems cooperate to divide the data handling demands of a network, or a plurality of storage devices cooperate to provide the data storage demands of one or more server computer systems. While the technology to perform these divisions of function is available or under development, problems can arise in such environments which are addressed and overcome by the invention here described.

The description which follows presupposes knowledge of network data communications and switches and routers as used in such communications networks. In particular, the description presupposes familiarity with the OSI model of network architecture which divides network operation into layers. A typical architecture based upon the OSI model extends from Layer 1 (also sometime identified as "L1") being the physical pathway or media through which signals are passed upwards through Layers 2, 3, 4 and so forth to Layer 7, the last mentioned being the layer of applications programming running on a computer system linked to the network. In this document, mention of L1, L2 and so forth is intended to refer to the corresponding layer of a network architecture. The disclosure also presupposes a fundamental understanding of bit strings known as packets and frames in such network communication.

SUMMARY OF THE INVENTION

With the foregoing as background, it is a purpose of this invention to facilitate the interconnection of a plurality of server computer systems into a server farm. In pursuing this purpose, each of a plurality of computer systems has a network processor provided thereto and functioning to coordinate the processing of data streams by the thus connected systems.

BRIEF DESCRIPTION OF THE DRAWINGS

Some of the purposes of the invention having been stated, others will appear as the description proceeds, when taken in connection with the accompanying drawings, in which.

DESCRIPTION OF THE PREFERRED EMBODIMENT(S)

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

Figure 1:
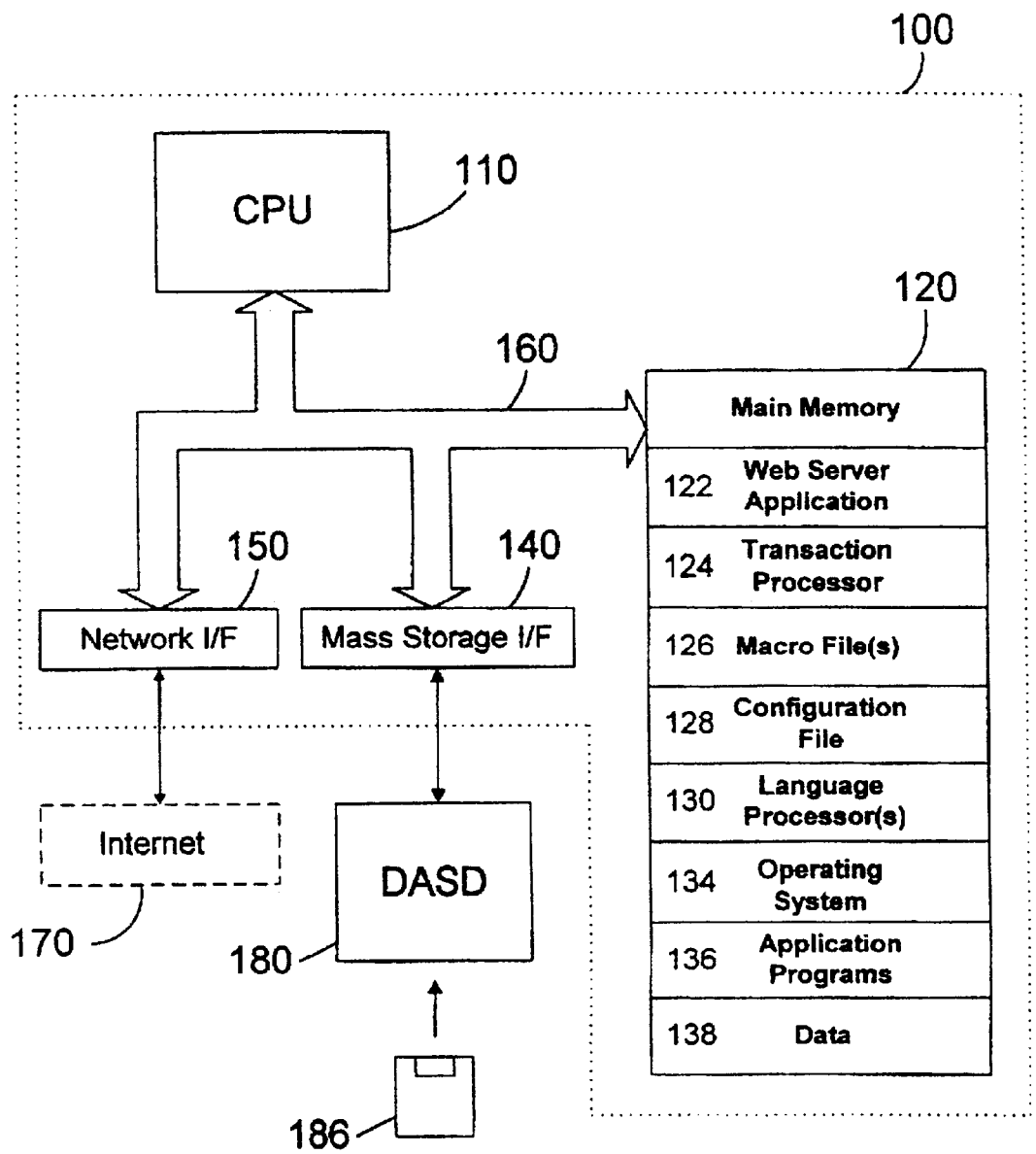
FIG. 1 is a representation of a computer system with which the present invention may be implemented.

Referring to FIG. 1, a computer system 100 in accordance with the present invention includes a central processing unit (CPU) 110, a main memory 120, a mass storage interface 140, and a network interface 150, all connected by a system bus 160. Those skilled in the art will appreciate that this system encompasses all types of computer systems: personal computers, midrange computers, mainframes, etc. Note that many additions, modifications, and deletions can be made to this computer system 100 within the scope of the invention. Examples of this are a computer monitor, input keyboard, cache memory, and peripheral devices such as printers. The present invention may operate as a web server, which is generally implemented with a personal or midrange computer.

CPU 110 can be constructed from one or more microprocessors and/or integrated circuits. CPU 110 executes program instructions stored in main memory 120. Main memory 120 stores programs and data that the computer may access. When computer system 100 starts up, CPU 110 initially executes the operating system 134 program instructions. Operating system 134 is a sophisticated program that manages the resources of the computer system 100. Some of these resources are the CPU 110, main memory 120, mass storage interface 140, network interface 150, and system bus 160.

The main memory 120 includes a web server application 122, a transaction processor 124, one or more macro files 126, a configuration file 128, one or more language processors 130, an operating system 134, one or more application programs 136, and program data 138. Application programs 136 are executed by CPU 110 under the control of operating system 134. Application programs 136 can be run with program data 138 as input. Application programs 136 can also output their results as program data 138 in main memory. When the computer system 100 operates as a web server, CPU 110 executes, among other things, a web server application 122. Transaction processor 124 is a program that processes an HTML page stored in one or more macro files 126. When transaction processor 124 is initialized, it reads configuration file 128 to correlate different types of queries to different language processors 130. When a query to dynamic data is found in a page, transaction processor 124 determines from the configuration data (read from the configuration file) which language processor 130 it should call to process the query. The appropriate language processor 130 then queries a data source, such as memory or a database, to retrieve the dynamic data. Language processor 130 passes the dynamic data to transaction processor 124, which inserts the dynamic data into the HTML data for the selected page.

Mass storage interface 140 allows computer system 100 to retrieve and store data from auxiliary storage devices such as magnetic disks (hard disks, diskettes) and optical disks (CD-ROM). These mass storage devices are commonly known as Direct Access Storage Devices (DASD), and act as a permanent store of information. One suitable type of DASD is a floppy disk drive 180 that reads data from and writes data to a floppy diskette 186. The information from the DASD can be in many forms. Common forms are application programs and program data. Data retrieved through mass storage interface 140 is often placed in main memory 120 where CPU 110 can process it.

While main memory 120 and DASD device 180 are typically separate storage devices, computer system 100 uses well known virtual addressing mechanisms that allow the programs of computer system 100 to behave as if they only have access to a large, single storage entity, instead of access to multiple, smaller storage entities (e.g., main memory 120 and DASD device 185). Therefore, while certain elements are shown to reside in main memory 120, those skilled in the art will recognize that these are not necessarily all completely contained in main memory 120 at the same time. It should be noted that the term "memory" is used herein to generically refer to the entire virtual memory of computer system 100.

Network interface 150 allows computer system 100 to send and receive data to and from any network the computer system with which it may be connected. This network may be a local area network (LAN), a wide network (WAN), or more specifically the Internet 170. Suitable methods of connecting to the Internet include known analog and/or digital techniques, as well as networking mechanisms that are developed in the future. Many different network protocols can be used to implement a network. These protocols are specialized computer programs that allow computers to communicate across a network. TCP/IP (Transmission Control Protocol/Internet Protocol), used to communicate across the Internet, is an example of a suitable network protocol.

System bus 160 allows data to be transferred among the various components of computer system 100. Although computer system 100 is shown to contain only a single main CPU and a single system bus, those skilled in the art will appreciate that the present invention may be practiced using a computer system that has multiple CPUs and/or multiple buses.

At this point, it is important to note that while the present invention has been (and will continue to be) described in the context of a fully functional computer system, those skilled in the art will appreciate that constituents of the present invention are capable of being distributed as a program product in a variety of forms, and that the present invention applies equally regardless of the particular type of signal bearing media used to actually carry out the distribution. Examples of signal bearing media include: recordable type media such as floppy disks (e.g., 186 of FIG. 1) and CD ROM, and transmission type media such as digital and analog communications links.

In the present invention a computer system 100 may be operated as a web server. To do so, a web server application 122 is executed by CPU 110. Another application program 136 may be run simultaneously on computer system 100 assuming that operating system 134 is a multi-tasking operating system. Web servers are generally connected to the Internet 170. As has been discussed, the Internet is a well known computer network that spans the world and is shared by millions of computers. There are many web servers on the Internet. Each computer linked to the Internet has its own unique address to enable it to communicate across the network with other computers. Many different types of data can be sent along the Internet. Examples are electronic mail, program data, digitized voice data, computer graphics, and web pages.

Figure 2:
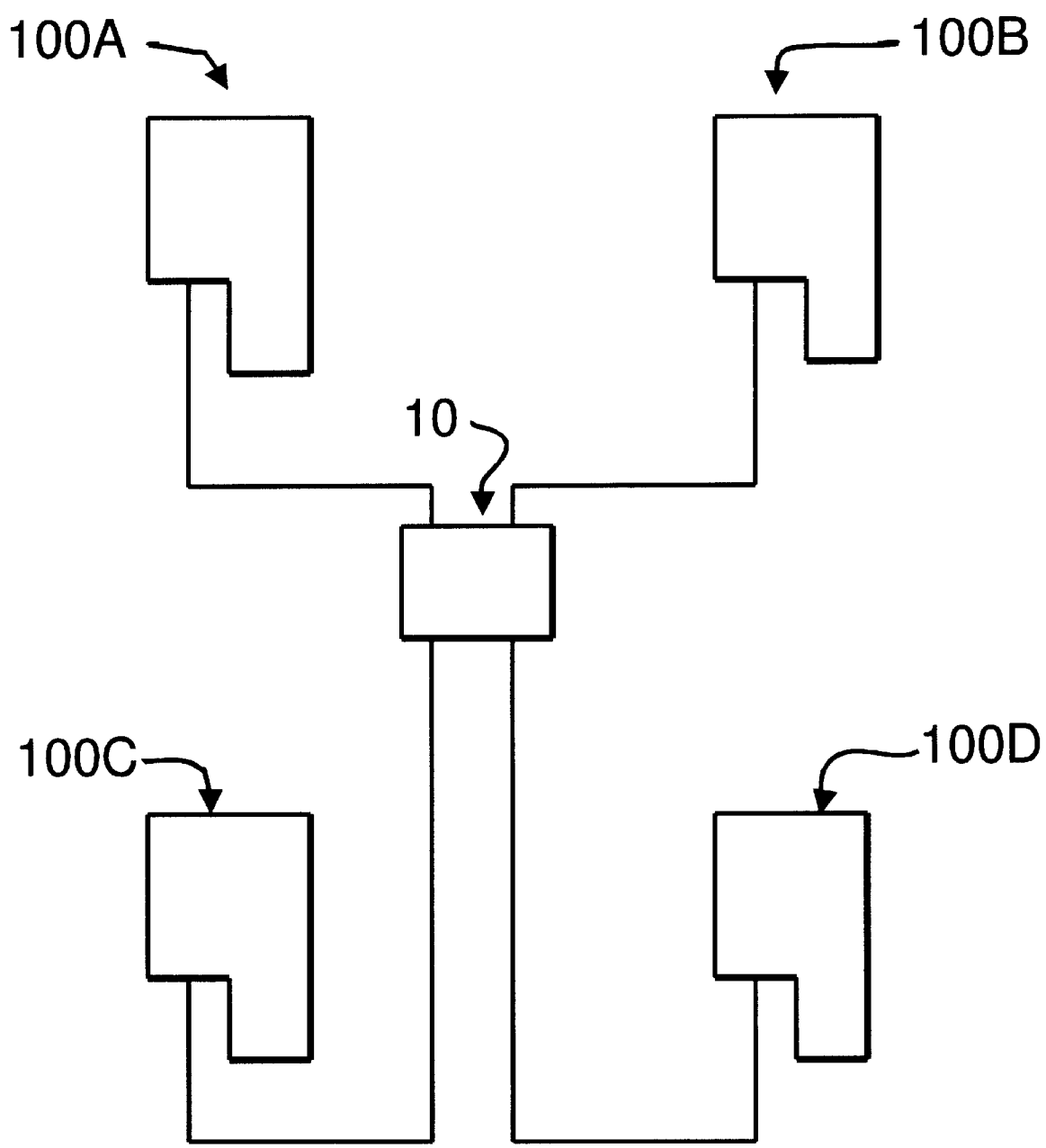
FIG. 2 is a somewhat schematic representation of a server farm formed using a plurality of computer systems as illustrated in FIG. 1 and a network processor as illustrated in FIGS. 3 and 4.
Figure 3:
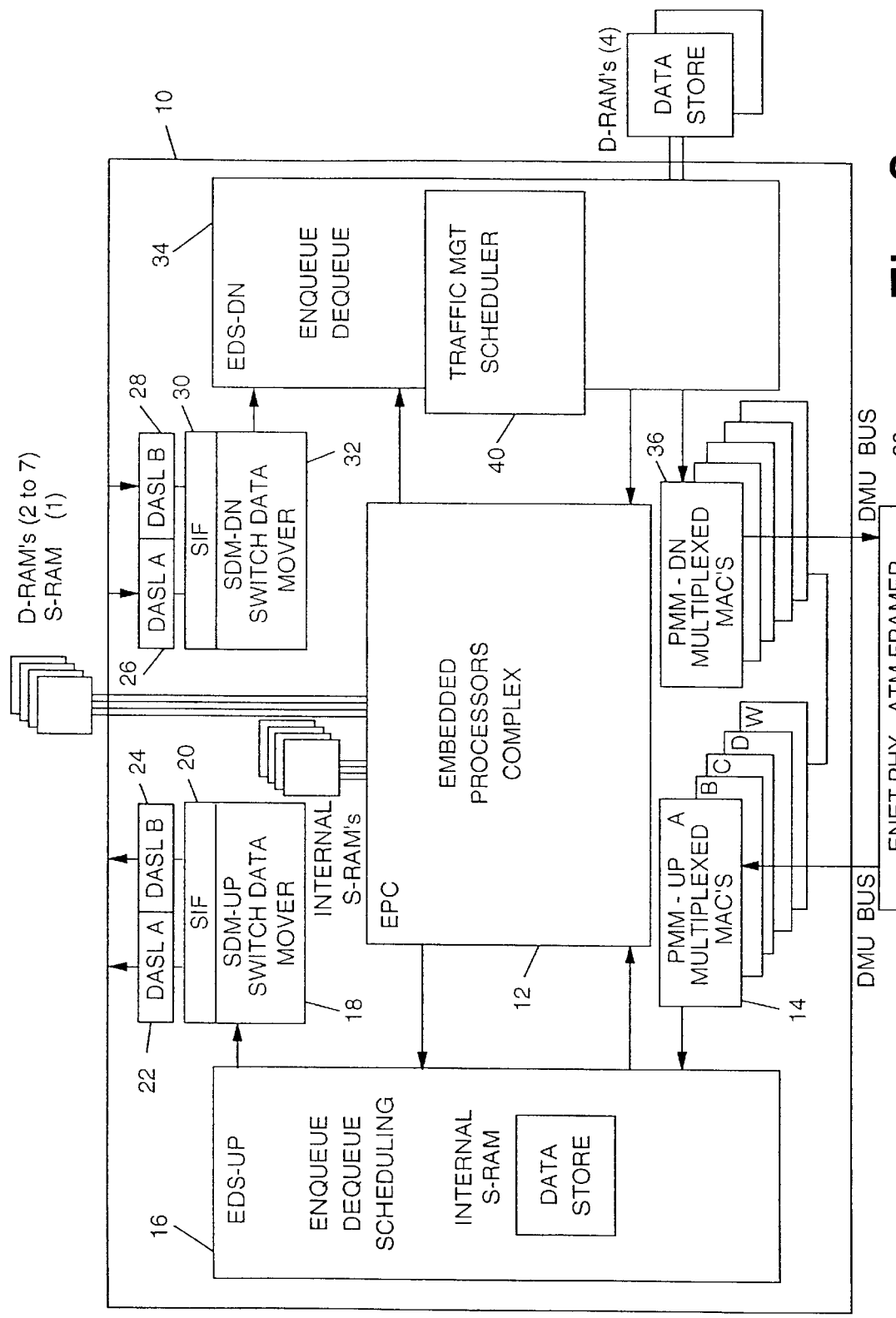
FIG. 3 is a somewhat schematic representation of a network processor as used in this invention.
Figure 4:
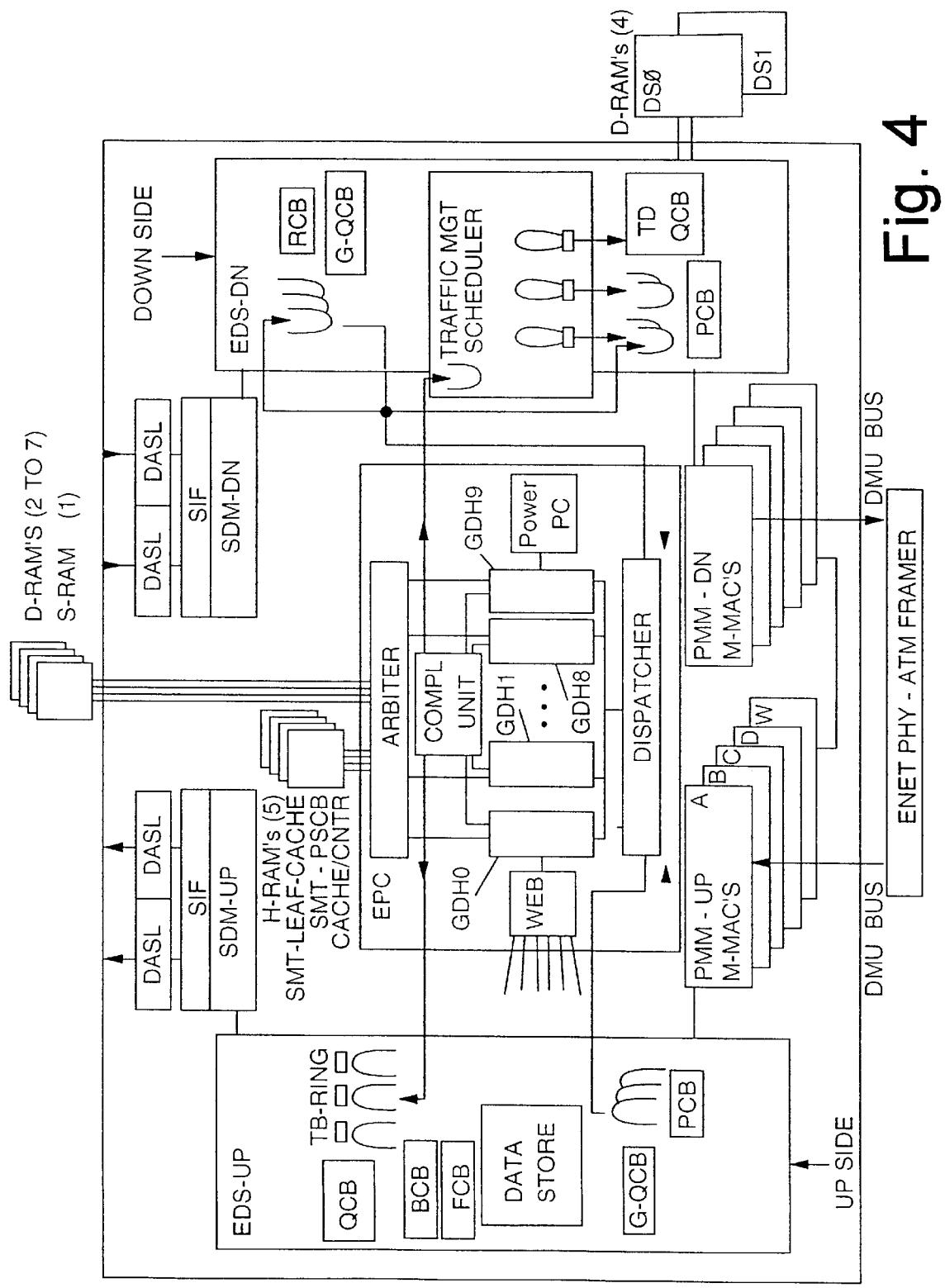
FIG. 4 is another, somewhat schematic, representation of a network processor as used in this invention.

Referring now to FIG. 2, a plurality of computer systems 100A, 100B, 100C, and 100D are coupled together through a network processor 10 to form a server farm. The network processor 10 is more fully illustrated and described in FIGS. 3 and 4 and the description of the structure there shown which follows hereinafter. The computer systems joined together in the farm may have differing assigned functions. For example, one may be designated to serve batch processing requests for data mining of data stored on associated DASD. Another in the same farm may be designated as a mail server. Yet another may be designated as handling real time requests for data stored on associated DASD. Yet another may be designated as an application server, making available to other systems on the network application programs which may be transferred for transitory or fugitive use on client systems. Alternatively, the systems may be serving as parallel web page host systems and be dynamically selected based upon incoming requests for service. Persons knowledgeable in the configuration and use of server farm systems will be able to understand the full range of alternative functions here briefly indicated and to develop still further alternatives as the flexibility of this invention becomes recognized.

Data bit streams moving to the server farm of FIG. 2 from any associated network will pass to the network processor 10. The network processor 10, in accordance with important distinguishing features of this invention, will process network communication protocol bits identified in the incoming bit streams and recognize packets or frames or the like which are assignable to one of the farm systems 100A, 100B, 100C and 100D based upon the designated service to be provided by that system. After assignment to the appropriate farm system and processing there, the packets, frames or the like are returned to the network processor for forwarding to the associated network after the network processor supplies the appropriate network communication protocol bits.

Movement of data bit streams to the appropriate one of the farm systems is accomplished, in accordance with this invention, at what is known as media speed. That is, the flow rate of data moving to the one farm system is the same or substantially the same as the flow rate in the network to which the network processor connects the server farm. Further, the movement of data bit streams from the network processor is to the appropriate one of the systems in the farm. Where the systems in the farm are serving a shared purpose, such as being web page hosts operating in parallel, the distribution may, for example, be for load balancing among the farm systems. Where the systems serve distinct designated purposes, the distribution will be for those designated purposes so that data streams related to mail are, for example, directed to a mail server while those for real time retrieval from a stored data base are directed to a server configured for that purpose.

The architecture used for apparatus disclosed hereinafter is based on an interface device or network processor hardware subsystem and a software library running on a control point processor. The interface device or network processor subsystem is a high performance frame forwarding engine designed for parsing and translation of L2, L3, and L4+ data strings. The interface device or network processor subsystem can provide a fast-path through an apparatus while the software library and control point processor provide management and route discovery functions needed to maintain the fast-path. The control point processor and the software library running thereon together define the Control Point (CP) of the system. The control point processor may be embedded within the network processor or physically separated therefrom.

Industry consultants have defined a network processor as a programmable communications integrated circuit capable of performing one or more of the following functions:

Packet classification—identifying a packet based on known characteristics, such as address or protocol;

Packet modification—modifying the packet to comply with IP, ATM, or other protocols (for example, updating the time-to-live field in the header for IP);

Queue/policy management—reflects the design strategy for packet queuing, de-queuing, and scheduling of packets for specific applications; and Packet forwarding—transmission and receipt of data over a switch fabric and forwarding or routing the packet to the appropriate address.

Although this definition is an accurate description of the basic features of early NPs, the full potential capabilities and benefits of NPs are yet to be realized. Network processors can increase the effective system bandwidth and solve latency problems in a broad range of applications by allowing networking tasks previously handled in software to be executed in hardware. In addition, NPs can provide speed improvements through architectures, such as parallel distributed processing and pipeline processing designs. These capabilities can enable efficient search engines, increase throughput, and provide rapid execution of complex tasks. This definition uses the word "packet", which is consistentwith usage commonly referring to wide area networks (WANs). The inventions here described are equally functional with "frames", a term consistent with usage commonly referring to local area networks (LANs).

Network processors are expected to become a fundamental network building block for networks in the same fashion that CPUs are for PCs. Typical capabilities offered by an NP are real-time processing, security, store and forward, switch fabric, and IP packet handling and learning capabilities.

The processor-model NP incorporates multiple general purpose processors and specialized logic. Integrators are turning to this design to provide scalable, flexible solutions that can accommodate change in a timely and cost-effective fashion. A processor-model NP allows distributed processing at lower levels of integration, providing higherthroughput, flexibilityand control. Programmabilitycan enable easy migration to new protocols and technologies, without requiring new ASIC designs.

While such a network processor supports multi-layer forwarding in hardware it can also operate as a L2 only switch and that is its default mode of operation in the simplest form disclosed in related applications. Each port will be put into a single domain allowing any device in the domain to communicate with any other device in the domain. The apparatus is configurable at L2 allowing system administrators the ability to configure features such as; grouping ports into separate domains or trunks, configuring Virtual LAN (VLAN) segments, or imposing filters.

Certain portions of the apparatus described hereinafter are designed to be a modular unit using an interface device or network processor (NP) and a Control Point (CP) as its fundamental building blocks. An optional switching fabric device can be used when more than two interface device subsystems are tied together. The optional switching fabric device may be as disclosed in U.S. Pat. No. 5,008,878 issued Apr. 16, 1991 for High Speed Modular Switching Apparatus for Circuit and Packet Switched Traffic mentioned hereinabove and incorporated herein by reference.

This apparatus may consist of a single assembly of an NP, a CP, and a media interconnection mechanism. However, a more complex apparatus is anticipated to be assembled using printed circuit board elements also here mentioned as "option cards" or "blades". The printed circuit board elements have circuit elements mounted thereon and are received in connectors provided in apparatus housings, such as in server computer system housings. The apparatus contemplates that cards can be exchanged among varying chassis or housings, provided that appropriate connectors and backplane electrical connections are provided in each. A basic component found on many if not all option cards is a carrier subsystem.

In its simplest form, an interface apparatus contemplated by this invention has a control point processor and an interface device operatively connected to the control point processor. Preferably and as here disclosed, the interface device (also here identified as a network processor or NP) is a unitary Very Large Scale Integrated (VLSI) circuit device or chip which has a semiconductor substrate; a plurality of interface processors formed on the substrate; internal instruction memory formed on said substrate and storing instructions accessibly to the interface processors; internal data memory formed on the substrate and storing data passing through the device accessibly to the interface processors; and a plurality of input/output ports. The interface processors are also sometimes herein identified as picoprocessors or processing units. The ports provided include at least one port connecting the internal data memory with external data memory and at least two other ports exchanging data passing through the interface device with an external device or network under the direction of the interface processors. The control point cooperates with the interface device by loading into the instruction memory instructions to be executed by the interface processors in directing the exchange of data between the data exchange input/output ports and the flow of data through the data memory.

The network processor here disclosed is deemed inventive apart from the assemblies and combinations into which it is incorporated, such as the server farms here described. Further, the network processor here disclosed is deemed to have within its elements here described other and further inventions not here fully discussed.

For a more complete understanding, FIG. 2 shows a block diagram for the interface device chip 10 that includes a substrate and a plurality of sub-assemblies integrated on the substrate. The sub-assemblies are arranged into an Upside configuration and a Downside configuration. As used herein, "Upside" refers to data flows inbound to the apparatus here disclosed, while "Downside" refers to data outbound from the apparatus to a device or network serviced by the apparatus. The data flow follows the respective configurations. As a consequence, there is an Upside data flow and a Downside data flow. The sub-assemblies in the Upside include Enqueue-Dequeue-Scheduling UP (EDS-UP) logic 16, multiplexed MAC's-UP (PPM-UP) 14, Switch Data Mover-UP (SDM-UP) 18, System Interface (SIF) 20, Data Align Serial Link A (DASLA) 22, and Data Align Serial Link B (DASLB) 24. A data align serial link is more fully described in copending U.S. patent application Ser. No. 09/330,968 filed Jun. 11, 1999 and entitled "High Speed Parallel/Serial Link for Data Communication" incorporated by reference hereinto to any extent necessary for a full understanding of the invention here disclosed. While the preferred form of the apparatus of this invention here disclosed uses a DASL link, the present invention contemplates that other forms of links may be employed to achieve relatively high data flow rates, particularly where the data flow are restricted to being within the VLSI structure.

The sub-assemblies in the downside include DASL-A 26, DASL-B 28, SIF 30, SDM-DN 32, EDS-DN 34, and PPM-DN 36. The chip also includes a plurality of internal S-RAM's, Traffic Mgt Scheduler 40, and Embedded Processor Complex (EPC) 12. An interface device 38 is coupled by respective DMU Busses to PMM 14 and 36. The interface 38 could be any suitable L1 circuitry, such as ethernet Physical (ENET PHY), ATM Framer, IP over SONET, etc. The type of interface is dictated in part by the network media or other device to which the chip is connected. A plurality of external D-RAM's and S-RAM are available for use by the chip.

The arrows show the general flow of data within the interface device. For example, frames received from a MAC are placed in internal Data Store buffers by the EDS-UP. These frames are identified as either normal Data Frames or system control Guided Frames and enqueued to the EPC (FIG. 1). The EPC contains N protocol processors capable of working on up to N frames in parallel (N>1). In an embodiment with ten protocol processors, two of the ten protocol processors are specialized; one for handling Guided Frames (the Generic Central Handler or GCH) and one for building Lookup Data in Control Memory (the Generic Tree Handler or GTH). The EPC also contains a dispatcher which matches new frames with idle processors, a completion unit which maintains frame sequence, a Common Instruction memory shared by all ten processors, a Classifier Hardware Assist which determines frame classification and coprocessor which helps determine the starting instruction address of the frame, Ingress and Egress Data Store interfaces which control read and write operations of frame buffers, a Control Memory Arbiter which allows the ten processors to share Control Memory, a Web Control, Arbiter and interface that allows debug access to internal Interface device data structures, as well as other hardware constructs.

Guided Frames are sent by the dispatcher to the GCH processor as it becomes available. Operations encoded in the Guided Frame are executed, such as register writes, counter reads, MAC configuration changes, and so on. Lookup table alterations, such as adding MAC or IP entries, are passed on to the Lookup Data processor for Control Memory operations, such as memory reads and writes. Some commands, such as MIB counter reads, require a response frame to be built and forwarded to the appropriate port on the appropriate Interface device. In some cases, the Guided Frame is encoded for the Egress side of Interface device. These frames are forwarded to the Egress side of the Interface device being queried, which then executes the encoded operations and builds any appropriate response frame.

Data frames are dispatched to the next available protocol processor for performing frame lookups. Frame data are passed to the protocol processor along with results from the Classifier Hardware Assist (CHA) Engine. The CHA parses IP or IPX. The results determine the Tree Search algorithm and starting Common Instruction Address (CIA). Tree Search algorithms supported included Fixed Match Trees (fixed size patterns requiring exact match, such as Layer 2 MAC tables), Longest prefix Match Trees (variable length patterns requiring variable length matches, such as subnet IP forwarding) and Software Managed Trees (two patterns defining either a range or a bit mask set, such as used for filter rules).

Lookup is performed with the aid of the Tree Search Engine (TSE) Coprocessor, which is a part of each protocol processor. The TSE Coprocessor performs Control memory accesses, freeing the protocol processor to continue execution. Control memory stores all tables, counters, and other data needed by the picocode. Control memory operations are managed by the Control memory Arbiter, which arbitrates memory access among the ten processor complexes.

Frame data are accessed through the Data Store Coprocessor. The Data Store Coprocessor contains a primary data buffer (holding up to eight 16 byte segments of frame data), a scratch pad data buffer (also holding up to eight 16-byte segments of frame data) and some control registers for Data Store operations. Once a match is found, Ingress frame alterations may include a VLAN header insertion or overlay. This alteration is not performed by the interface device processor complex, but rather hardware flags are derived and other Ingress Switch Interface hardware performs the alterations. Other frame alterations can be accomplished by the picocode and the Data Store Coprocessor by modifying the frame contents held in the Ingress Data Store.

Egress Tree Searches support the same algorithms as supported for Ingress Searches. Lookup is performed with the TSE Coprocessor, freeing the protocol processor to continue execution. All Control memory operations are managed by the Control memory Arbiter, which allocates memory access among the ten processor complexes.

Egress frame data are accessed through the Data Store Coprocessor. The Data Store Coprocessor contains a primary data buffer (holding up to eight 16-byte segments of frame data), a scratch pad data buffer (also holding up to eight 16-byte segments of frame data) and some control registers for Data Store operations. The result of a successful lookup contains forwarding information and, in some cases, frame alteration information. Frame alterations can include VLAN header deletion, Time to Live increment (IPX) or decrement (IP), IP Header Checksum recalculation, Ethernet frame CRC overlay or insertion and MAC DA/SA overlay or insertion. IP Header checksums are prepared by the Checksum Coprocessor. Alterations are not performed by the Interface device Processor Complex, but rather hardware flags are created and PMM Egress hardware performs the alterations. Upon completion, the Enqueue Coprocessor is used to help build the necessary formats for enqueuing the frame in the EDS Egress queues and sending them to the Completion Unit. The Completion Unit guarantees frame order from the ten protocol processors to the EDS Egress queues feeding the egress MACs.

The completed frames are finally sent by PMM Egress hardware to the MACs and out the ports.

A set of interconnections, referred to as the Web, allows access to internal registers, counters and memory. The Web also includes an external interface to control instruction step and interrupt control for debugging and diagnostics.

The Tree Search Engine coprocessor provides memory range checking, illegal memory access notification and performs tree search instructions (such as memory read, write or read-add-write) operating in parallel with protocol processor execution.

The Dispatcher controls the passing of frames to the ten protocol processors and manages interrupts and timers.

The Completion Unit guarantees frame order from the processor complex to target port queues. A rich instruction set includes conditional execution, packing (for input hash keys), conditional branching, signed and unsigned operations, counts of leading zeros and more.

The Classifier Hardware Assist engine passes each frame's Layer 2 and Layer 3 protocol header and provides this information with frames as they are dispatched to the protocol processors.

The Control memory Arbiter controls processor access to both internal and external memory.

Egress frames may be stored in either one External Data Buffer (e.g. DSO) or two External Data Buffers (DS0 and DS1). Each Buffer can be comprised of a pair of 2M×16 bit×4 bank DDR DRAM (storing up to 256K 64-byte frames) or a pair of 4M×16 bit×4 bank DDR DRAM (storing up to 512K 64-byte frames). Choose the single External Data Buffer (e.g. DSO) for 2.28 Mbps or add the second Buffer (e.g. DS1) to support 4.57 Mbps Layer 2 and Layer 3 switching. Adding the second Buffer improves performance, but it does not increase frame capacity. The External Data Buffer interface runs at a 133 MHz clock rate with a 266 MHz data strobe and supports configurable CAS latency and drive strength.

Fixed Frame alterations include VLAN tag insertions in the Ingress direction and VLAN tag deletions, Time To Live increment/decrement (IP, IPx), Ethernet CRC overlay/insert and MAC DA/SA overlay/insert in the Egress direction.

Port mirroring allows one receive port and one transmit port to be copied to a system designated observation port without using protocol processor resources. Mirrored Interface device ports are configured to add frame and switch control data. A separate data path allows direct frame enqueuing to the Ingress Switch interface.

In the drawings and specifications there has been set forth a preferred embodiment of the invention and, although specific terms are used, the description thus given uses terminology in a generic and descriptive sense only and not for purposes of limitation.

What is claimed is:

1. Apparatus comprising:
   a plurality of a computer systems each having
      a central processing unit, and
      server memory;
   a network processor coupled to each of said computer systems and joining the coupled computer systems into a server farm, said network processor having
      a plurality of interface processors;
      instruction memory storing instructions accessibly to said interface processors;
      data memory storing data passing through said network processor to and from each of said coupled computer systems accessibly to said interface processors; and
      a plurality of input/output ports;
         one of said input/output ports exchanging data passing through said network processor with an external network under the direction of said interface processors;
         others of said input/output ports exchanging data passing through said network processor with said coupled computer systems;
   said network processor comprising a single semiconductor substrate wherein said interface processors, said instruction memory, said data memory and said input/output parts are formed on said semiconductor substrate;
   said network processor cooperating with said coupled computer systems in directing the exchange of data between said input/output ports and the flow of data through said data memory to and from said coupled computer systems in response to execution by said interface processors of instructions loaded into said instruction memory.

2. Apparatus according to claim 1 wherein said network processor processes communication protocols and exchanges with said coupled computer systems application data to be processed by said computer systems.

3. Apparatus according to claim 2 wherein said coupled computer systems serve diverse purposes and said network processor directs application data to the appropriate one of said coupled computer systems for exercising the data in accordance with the appropriate purpose therefor.

4. Apparatus according to claim 2 wherein said coupled computer systems serve a common purpose and said network processor directs application data to varying ones of said coupled computer systems for exercising the data in a balanced flow among said coupled computer systems.

5. Apparatus according to claim 1 wherein the number of said interface processors exceeds four.

* * * * *